(12) United States Patent
Oh

(10) Patent No.: US 7,506,520 B2
(45) Date of Patent: Mar. 24, 2009

(54) METHOD FOR CONTROLLING OPERATION OF REFRIGERATOR

(75) Inventor: Seung Hwan Oh, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 11/186,963

(22) Filed: Jul. 22, 2005

(65) Prior Publication Data
US 2006/0144063 A1 Jul. 6, 2006

(30) Foreign Application Priority Data
Dec. 30, 2004 (KR) ............... 10-2004-0116546

(51) Int. Cl.
F25D 17/00 (2006.01)
F25B 5/00 (2006.01)
F25B 49/00 (2006.01)
F25B 39/02 (2006.01)

(52) U.S. Cl. .................. 62/180; 62/200; 62/229; 62/504

(58) Field of Classification Search .......... 62/179, 62/180, 199, 200, 228.1, 229, 504, 176.1, 62/176.6; 236/44 A, 44 C
See application file for complete search history.

(56) References Cited

U.S. PATENT DOCUMENTS

| 4,569,205 | A | * | 2/1986 | Dempou et al. | ........ 62/155 |
| 5,657,638 | A | | 8/1997 | Erdman et al. | |
| 6,185,948 | B1 | * | 2/2001 | Niki et al. | ........ 62/199 |
| 6,370,895 | B1 | * | 4/2002 | Sakuma et al. | ........ 62/199 |
| 6,622,503 | B1 | | 9/2003 | Bennett et al. | |

FOREIGN PATENT DOCUMENTS

| JP | 2001280784 A | * | 10/2001 |
| KR | 2000-0034719 A | | 6/2000 |
| KR | 2000-0034721 A | | 6/2000 |
| KR | 2000-0034722 A | | 6/2000 |

* cited by examiner

*Primary Examiner*—Marc E Norman
(74) *Attorney, Agent, or Firm*—Sughrue Mion, PLLC

(57) ABSTRACT

A method for controlling operation of a refrigerator to enable independent cooling of a freezing chamber and a refrigerating chamber. The method prevents temperature rising of the refrigerator by controlling a refrigerant passage switching valve after stopping operation of a compressor, thereby reducing electricity consumption and increasing humidification effects of the refrigerator by controlling an operating time point of a refrigerating chamber fan. The method for controlling operation of the refrigerator, having a plurality of storage chambers, a plurality of evaporators installed in the respective storage chambers, and a refrigerant passage switching valve to switch refrigerant passages extending to the evaporators, includes the steps of sensing temperatures of the plurality of storage chambers and stopping operation of the compressor if the temperatures reach preset temperatures, and controlling the refrigerant passage switching valve after stopping operation of the compressor to close refrigerant passages to the plurality of evaporators.

11 Claims, 7 Drawing Sheets

METHOD FOR CONTROLLING OPERATION OF REFRIGERATOR

CROSS-REFERENCE TO RELATED APPLICATION

This application claims the benefit of Korean Patent Application No. 2004-116546, filed on Dec. 30, 2004 in the Korean Intellectual Property Office, the disclosure of which is incorporated herein by reference.

BACKGROUND OF THE INVENTION

1. Field of the Invention

The present invention relates to a method for controlling operation of a refrigerator, and, more particularly, to a method for controlling operation of a refrigerator capable of reducing electricity consumption by controlling a refrigerant passage switching valve after operation of a compressor stops.

2. Description of the Related Art

In general, a refrigerator is an appliance operating according to a refrigeration cycle that circulates a refrigerant into the refrigerator. The refrigerator is used to store various foods in a fresh state for a long time by providing cold air, produced by absorption of surrounding heat generated during evaporation of a liquid-state refrigerant, into food storage chambers, such as a freezing chamber and refrigerating chamber thereof. Such a refrigerator lately is increasing in size and capacity to store a large amount of foods.

A cooling system, employed in the refrigeration cycle, includes: a compressor to compress a refrigerant into a high-temperature and high-pressure state; a condenser to condense the compressed refrigerant through heat exchange with surrounding air; capillary tubes to expand the condensed refrigerant to a low pressure state; and a freezing chamber evaporator and refrigerating chamber evaporator to evaporate the expanded low-pressure refrigerant through heat exchange with foods stored in the refrigerator.

The freezing chamber evaporator and refrigerating chamber evaporator are installed in a freezing chamber and refrigerating chamber, respectively, to enable independent cooling of both the chambers.

Such a cooling system further includes: a refrigerant passage switching valve, which switches refrigerant passages to selectively or simultaneously supply the refrigerant, passed through the condenser, to the freezing chamber evaporator and/or the refrigerating chamber evaporator; and a freezing chamber fan and refrigerating chamber fan, which circulate the cold air, passed through the freezing chamber evaporator and refrigerating chamber evaporator, throughout the freezing chamber and refrigerating chamber, respectively.

In the above described refrigerator, the compressor starts to operate after a temperature of the freezing chamber or refrigerating chamber rises beyond an associated preset temperature. A conventional operation control pattern of the refrigerator will be explained with reference to FIG. 1.

Upon operation of the compressor, the refrigerating chamber fan and the freezing chamber fan are driven simultaneously, and the refrigerant passage switching valve is controlled to discharge the refrigerant to only the refrigerating chamber until the temperature of the refrigerating chamber drops less than the associated preset temperature, i.e. refrigerating chamber preset temperature.

If the temperature of the refrigerating chamber drops less than the refrigerating chamber preset temperature, the refrigerant passage switching valve is controlled to discharge the refrigerant to only the freezing chamber while preventing the refrigerant from entering the refrigerating chamber. In this case, the refrigerating chamber fan is further driven only for a predetermined time sufficient to perform a high-humidity maintenance control operation (i.e. defrosting using a valve) of the refrigerating chamber that circulates the cold air, absorbing frost or dew generated on the refrigerating chamber evaporator, in the refrigerator.

If the temperature of the freezing chamber drops less than the associated preset temperature, i.e. freezing chamber preset temperature, the refrigerating chamber fan is again operated for a predetermined time as the operation of the compressor stops, and the refrigerant passage switching valve is controlled to discharge the refrigerant to only the refrigerating chamber.

Once the operation of the refrigerating chamber fan stops after the lapse of the predetermined time, the refrigerant passage switching valve is controlled to discharge the refrigerant to both the refrigerating chamber and the freezing chamber, achieving pressure balance of the refrigerant passages. Such a refrigerator operation control routine is repeated while checking whether or not the temperature of the refrigerating chamber or freezing chamber rises beyond the associated preset temperature.

However, the conventional operation control pattern has a problem in that, although the refrigerant passage switching valve is readily opened to the refrigerating chamber and freezing chamber after the operation of the compressor stops to thereby achieve rapid pressure balance of the refrigerant passages, the refrigerant flows from a high-pressure side to a low-pressure side, causing rising of the temperatures of the refrigerating chamber and freezing chamber and resulting in an increase of electricity consumption due to an increased operational load.

Further, the high-humidity maintenance control operation of the refrigerating chamber, which is obtained by further driving the refrigerating chamber fan for the predetermined time while directing the refrigerant into the freezing chamber after completing temperature control of the refrigerating chamber, achieves only minor humidification effects even if the refrigerating chamber fan is driven to blow the frost generated on the refrigerating chamber evaporator into the refrigerator, since a temperature of the refrigerating chamber evaporator is kept at a sub-zero temperature, i.e. a temperature of approximately −15° C.

SUMMARY OF THE INVENTION

The present invention has been made in view of the above mentioned problems, and an aspect of the invention is to provide a method for controlling operation of a refrigerator which can prevent rising of an interior temperature of the refrigerator by closing a refrigerant passage switching valve to prevent a refrigerant from entering a refrigerating chamber and freezing chamber after operation of a compressor stops, resulting in a reduction in operational load and electricity consumption.

Another aspect of the invention is to provide a method for controlling operation of a refrigerator which can increase humidification effects of the refrigerator by operating a refrigerating chamber fan when a temperature of a refrigerating chamber evaporator rises above a predetermined temperature after operation of the compressor stops.

In accordance with an aspect, the present invention provides a method for controlling operation of a refrigerator having a plurality of storage chambers, a plurality of evaporators installed in the plurality of storage chambers, and a refrigerant passage switching valve to switch refrigerant passages extending to the evaporators, the method including: sensing temperatures of the plurality of storage chambers to determine whether or not the temperatures of the storage chambers reach preset temperatures; stopping operation of a compressor if the temperatures of the storage chambers reach the preset temperatures; and controlling the refrigerant passage switching valve after stopping operation of the compressor to close the refrigerant passages to the plurality of evaporators.

In accordance with another aspect, the present invention provides a method for controlling operation of a refrigerator having a plurality of storage chambers, and a plurality of evaporators and cold air circulating fans installed in the plurality of storage chambers, respectively, the method including: sensing temperatures of the plurality of storage chambers to determine whether or not the temperatures of the storage chambers reach preset temperatures; stopping operation of a compressor if the temperatures of the storage chambers reach the preset temperatures; sensing a temperature of some of the plurality of evaporators after stopping operation of the compressor to determine whether or not the temperature of the some of the plurality of evaporators is more than a preset standard temperature; and operating the cold air circulating fans if the temperature of the some of the plurality of evaporators is more than the standard temperature to control humidity of some of the plurality of storage chambers.

In accordance with yet another aspect, the present invention provides a method for controlling operation of a refrigerator having a plurality of storage chambers, a plurality of evaporators and cold air circulating fans installed in the plurality of storage chambers, respectively, and a refrigerant passage switching valve to switch refrigerant passages extending to the plurality of evaporators, the method comprising: sensing temperatures of the plurality of storage chambers and stopping operation of a compressor if the sensed temperatures reach preset temperatures; controlling the refrigerant passage switching valve after stopping operation of the compressor to close the refrigerant passages to the plurality of evaporators; calculating a difference between the sensed temperatures and preset compressor operation starting temperatures after closing the refrigerant passages and controlling the refrigerant passage switching valve if the temperature difference belongs within a predetermined temperature range so as to direct the refrigerant to some of the plurality of evaporators; and operating the cold air circulating fans if the temperature of the some of the plurality of evaporators is more than a preset standard temperature after closing the refrigerant passages so as to control humidity of some of the plurality of storage chambers.

Additional aspects of the invention will be set forth in part in the description which follows and, in part, will be obvious from the description, or may be learned by practice of the invention.

BRIEF DESCRIPTION OF THE DRAWINGS

These and/or other aspects of the invention will become apparent and more easily appreciated from the following description of the exemplary embodiments, taken in conjunction with the accompanying drawings of which.

DETAILED DESCRIPTION OF THE EXEMPLARY EMBODIMENTS

Figure 1:
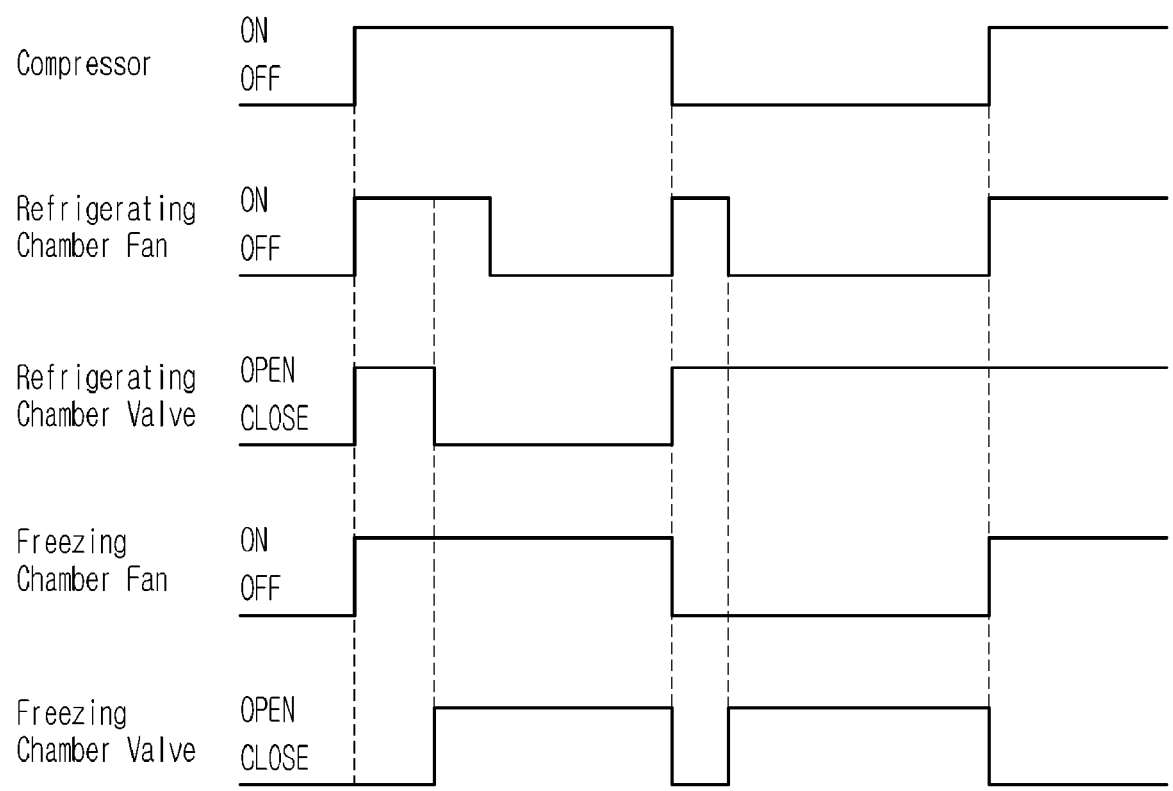
FIG. 1 is a diagram illustrating an operation control pattern of a conventional refrigerator.

Reference will now be made in detail to the exemplary embodiments of the present invention, examples of which are illustrated in the accompanying drawings, wherein like reference numerals refer to the like elements throughout. The exemplary embodiment is described below to explain the present invention by referring to the figures.

Figure 2:
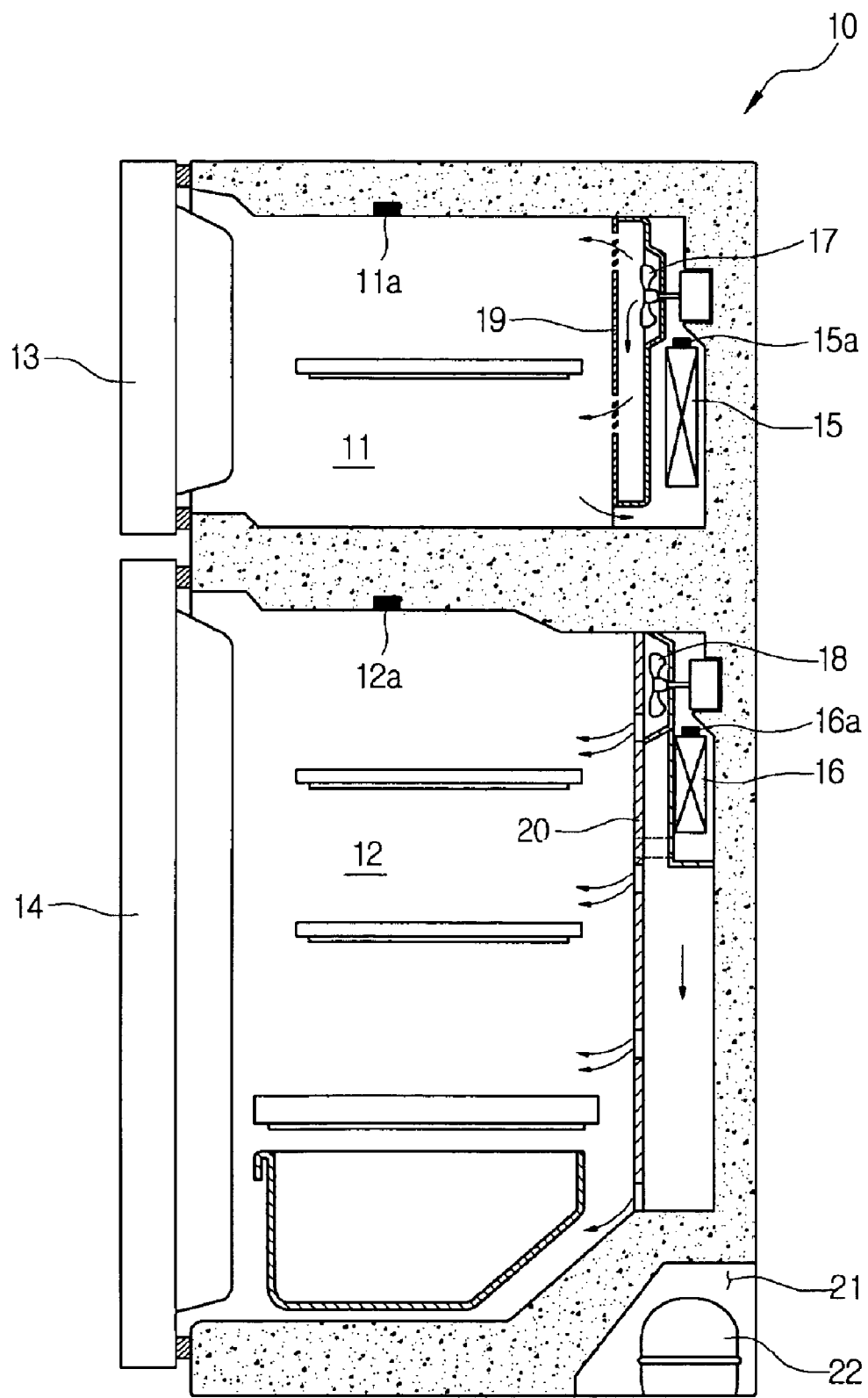
FIG. 2 is a side sectional view of a refrigerator according to an exemplary embodiment of the present invention.

FIG. 2 is a side sectional view of a refrigerator according to an exemplary embodiment of the present invention.

As shown in FIG. 2, the refrigerator of the present invention comprises a body 10 having sectionalized two storage chambers, i.e. an upper freezing chamber 11 and a lower refrigerating chamber 12, and a freezing chamber door 13 and a refrigerating chamber door 14 to open or close opened front surfaces of the freezing chamber 11 and the refrigerating chamber 12, respectively.

The freezing chamber 11 and the refrigerating chamber 12 are provided, respectively, with a freezing chamber temperature sensor 11a and a refrigerating chamber temperature sensor 12a, which are inserted in a wall surface position of the respective chambers to sense a temperature of the respective chambers. Further, in rear regions of the freezing chamber 11 and the refrigerating chamber 12 are provided, respectively, a freezing chamber evaporator 15 and a refrigerating chamber evaporator 16 for independent cooling of the freezing chamber 11 and the refrigerating chamber 12.

Immediately above the freezing chamber evaporator 15 and the refrigerating chamber evaporator 16 are disposed a freezing chamber evaporator temperature sensor 15a and a refrigerating chamber evaporator temperature sensor 16a, respectively, to sense temperatures of both the freezing chamber evaporator 15 and the refrigerating chamber evaporator 16.

The freezing chamber evaporator temperature sensor 15a and the refrigerating chamber evaporator temperature sensor 16a are negative temperature coefficient (NTC) thermistors.

The NTC thermistors, having a negative temperature coefficient, is characterized in that it has a low resistance if a temperature of a certain space, where the NTC thermistor is located, is high, but has a high resistance if the space temperature is low. Thus, if the resistance of the NTC thermistor is given, the temperature of the space, where the NTC thermistor is located, can be easily calculated from a known NTC thermistor resistance-temperature relation.

Adjacent to the freezing chamber evaporator 15 and the refrigerating chamber evaporator 16, a freezing chamber fan 17 and a refrigerating chamber fan 18 are provided, respectively, to circulate cold air into the freezing chamber 11 and the refrigerating chamber 12, and cold air guiding ducts 19 and 20 are provided to guide circulation of the cold air inside the freezing chamber 11 and the refrigerating chamber 12, respectively.

The above described refrigerator further comprises a rear machine room 21 sectionalized as a separate space below the body 10. The machine room 21 accommodates a compressor 22, a condenser (see FIG. 3), etc.

Figure 3:
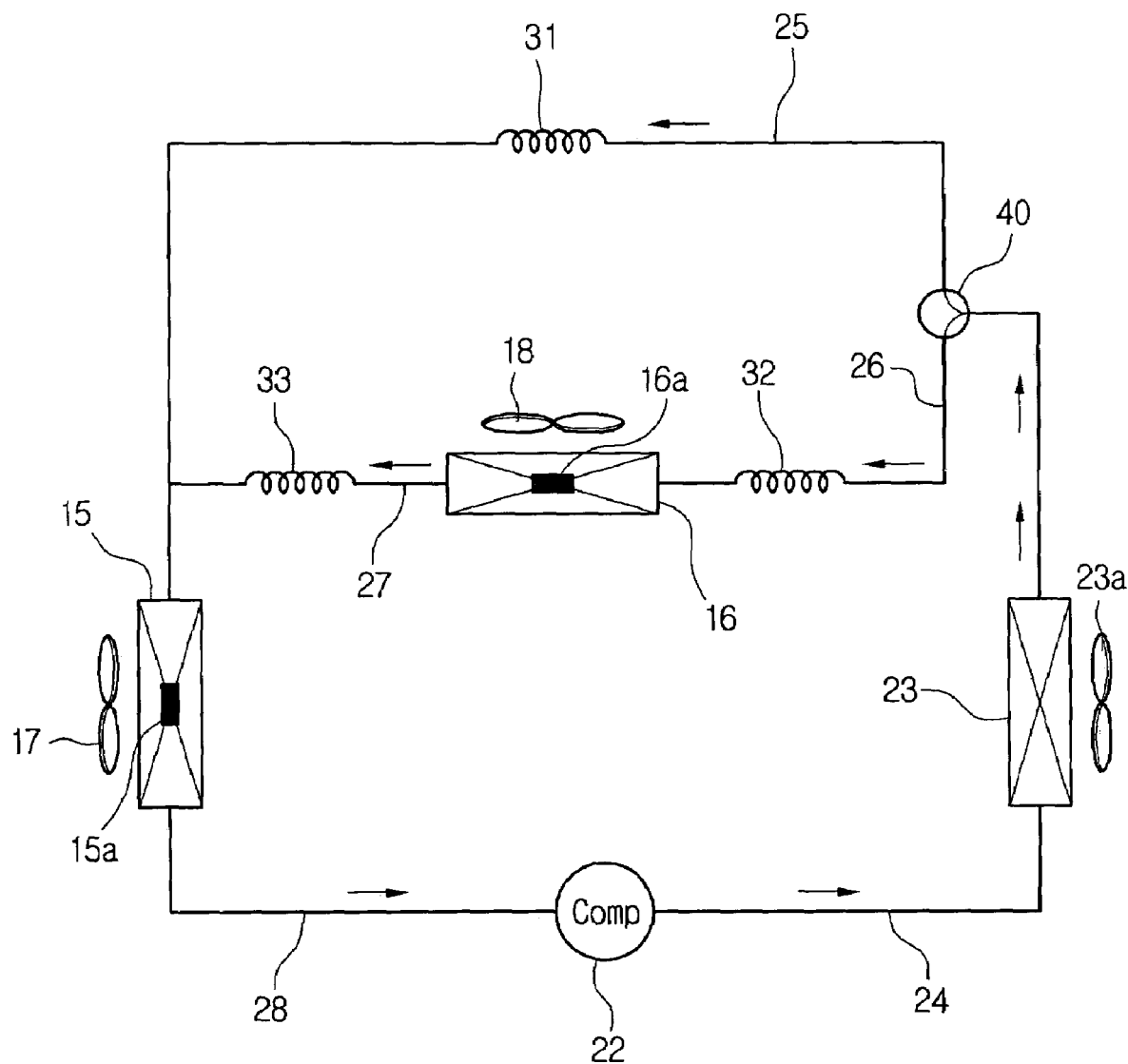
FIG. 3 is a diagram illustrating a refrigeration cycle of the refrigerator according to an exemplary embodiment of the present invention.

FIG. 3 is a diagram illustrating a refrigeration cycle of the refrigerator according to an exemplary embodiment of the present invention.

Referring to FIG. 3, the refrigerator of the present invention comprises the compressor 22 to compress a refrigerant, a condenser 23 connected to a pipe 24 at an exit side of the compressor 22 and adapted to condense the refrigerant, passed through the compressor 22, by heat exchange with surrounding air using a fan 23a, and a refrigerant passage switching valve 40 to switch refrigerant passages so as to selectively or simultaneously supply the refrigerant to the freezing chamber evaporator 15 and/or the refrigerating chamber evaporator 16.

The refrigerant passage switching valve 40 is a three-way valve having one entrance and two exits. Such a switching valve 40 implements switching of the refrigerant passages as one of the two exits is selectively opened or both the exits are simultaneously opened or closed.

From the refrigerant passage switching valve 40 are diverged a first pipe 25 connected to the freezing chamber evaporator 15 and a second pipe 26 connected to the refrigerating chamber evaporator 16. Further, a third pipe 27 extends from an exit of the refrigerating chamber evaporator 16 so that it is merged to the first pipe 25, which is connected to an entrance of the freezing chamber evaporator 15. Such a third pipe 27 permits the refrigerant, passed through the refrigerating chamber evaporator 16, to pass through the freezing chamber evaporator 15. The refrigerant, passed through the freezing chamber evaporator 15, is in a gas state. Finally, the refrigerant gas returns to the compressor 22 through a pipe 28 that connects the freezing chamber evaporator 15 with the compressor 22.

The first pipe 25 is provided with a first capillary tube 31 to depressurize and expand the refrigerant being supplied to the freezing chamber evaporator 15, and the second pipe 26 is provided with a second capillary tube 32 to depressurize and expand the refrigerant being supplied to the refrigerating chamber evaporator 16. Similarly, the third pipe 27 is provided with a third capillary tube 33 to repeatedly depressurize and expand the refrigerant, passed through the refrigerating chamber evaporator 16 before being merged to the first pipe 25.

As stated above, to the respective freezing chamber evaporator 15 and refrigerating chamber evaporator 16 are allotted the freezing chamber fan 17 and the refrigerating chamber fan 18 for the circulation of the cold air as well as the freezing chamber temperature sensor 15a and the refrigerating chamber temperature sensor 16a for sensing the temperatures of the respective chambers.

Figure 4:
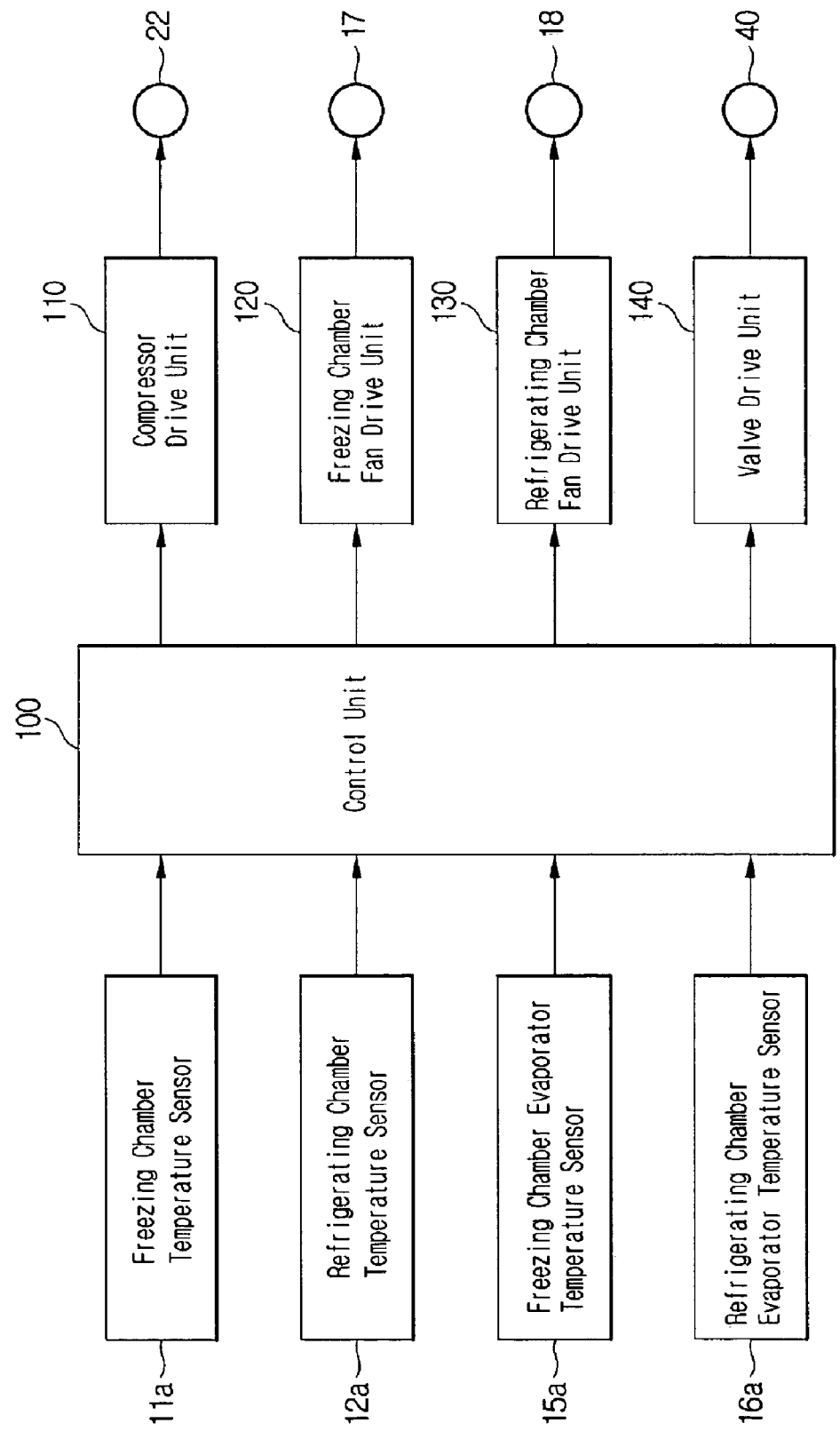
FIG. 4 is a block diagram of an operation control system of the refrigerator according to an exemplary embodiment of the present invention.

FIG. 4 is a block diagram illustrating an operation control system of the refrigerator according to an exemplary embodiment of the present invention. As shown in FIG. 4, in addition to the elements shown in FIG. 3, the refrigerator of the exemplary embodiment of the present invention further comprises a control unit 100 to control respective elements, a compressor drive unit 110 to drive the compressor 22, a freezing chamber fan drive unit 120 to drive the freezing chamber fan 17, a refrigerating chamber fan drive unit 130 to drive the refrigerating chamber fan 18, and a valve drive unit 140 to selectively open or close the refrigerant passage switching valve 40.

Now, the operation sequence and functional effects of an operation control method of the refrigerator configured as stated above will be explained.

Figure 5A:
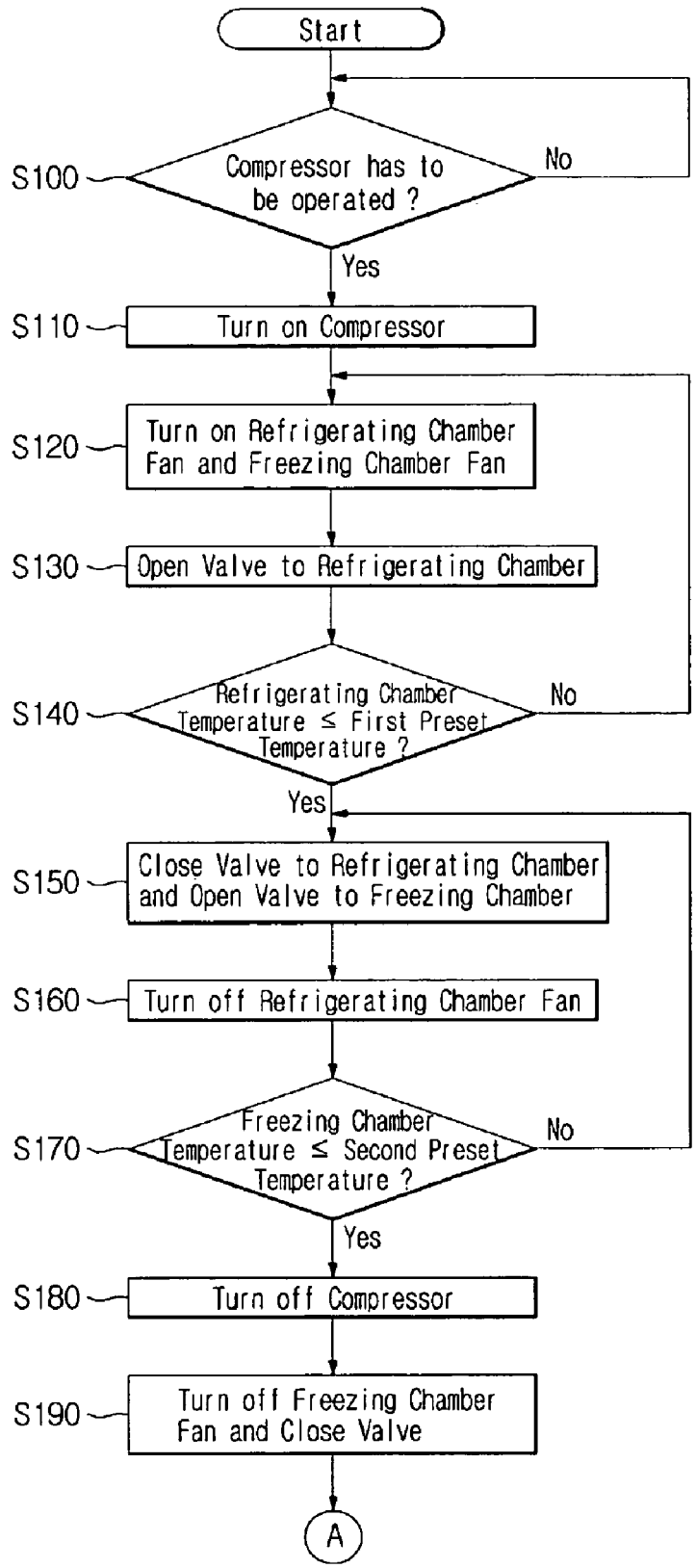
FIGS. 5A and 5B are flow charts illustrating an operation control method of the refrigerator according to an exemplary embodiment of the present invention.
Figure 5B:
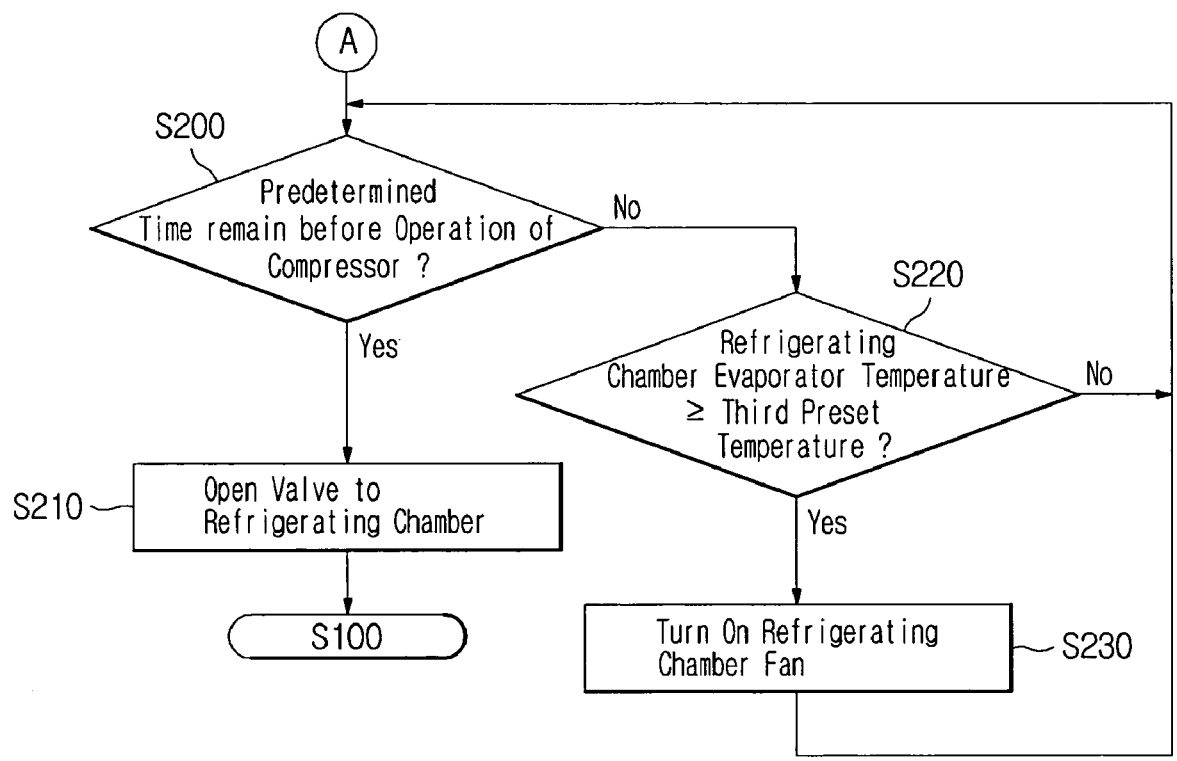

FIGS. 5A and 5B are flow charts illustrating the sequence of the operation control method of the refrigerator according to the present invention. In the refrigerator of the present invention wherein the freezing chamber 11 is provided with the freezing chamber evaporator 15 and the freezing chamber fan 17 and the refrigerating chamber 12 is provided with the refrigerating chamber evaporator 16 and the refrigerating chamber fan 18 to enable independent cooling of the respective chambers, FIGS. 5A and 5B explain an operation control pattern of the refrigerant passage switching valve 40 which is adapted to selectively or simultaneously supply the refrigerant into the freezing chamber evaporator 15 and/or the refrigerating chamber evaporator 16.

If a user sets control target temperatures of the freezing chamber 11 and the refrigerating chamber 12, the control unit 100 determines whether or not the compressor 22 has to be operated (S100).

The operation of the compressor 22 is determined depending on a temperature of the refrigerator. That is, that the compressor 22 has to be operated if a refrigerating chamber temperature sensed by the refrigerating chamber temperature sensor 12a is higher than a first preset temperature or if a freezing chamber temperature sensed by the freezing chamber temperature sensor 11a is higher than a second preset temperature.

The first preset temperature is the control target temperature of the refrigerating chamber 12, and the second preset temperature is the control target temperature of the freezing chamber 11. These preset temperatures are adjustable in multiple stages through manual operation using temperature adjustors or buttons.

If the compressor 22 has to be operated, the control unit 100 turns on the compressor 22 via the compressor drive unit 110 (S110).

Figure 6:
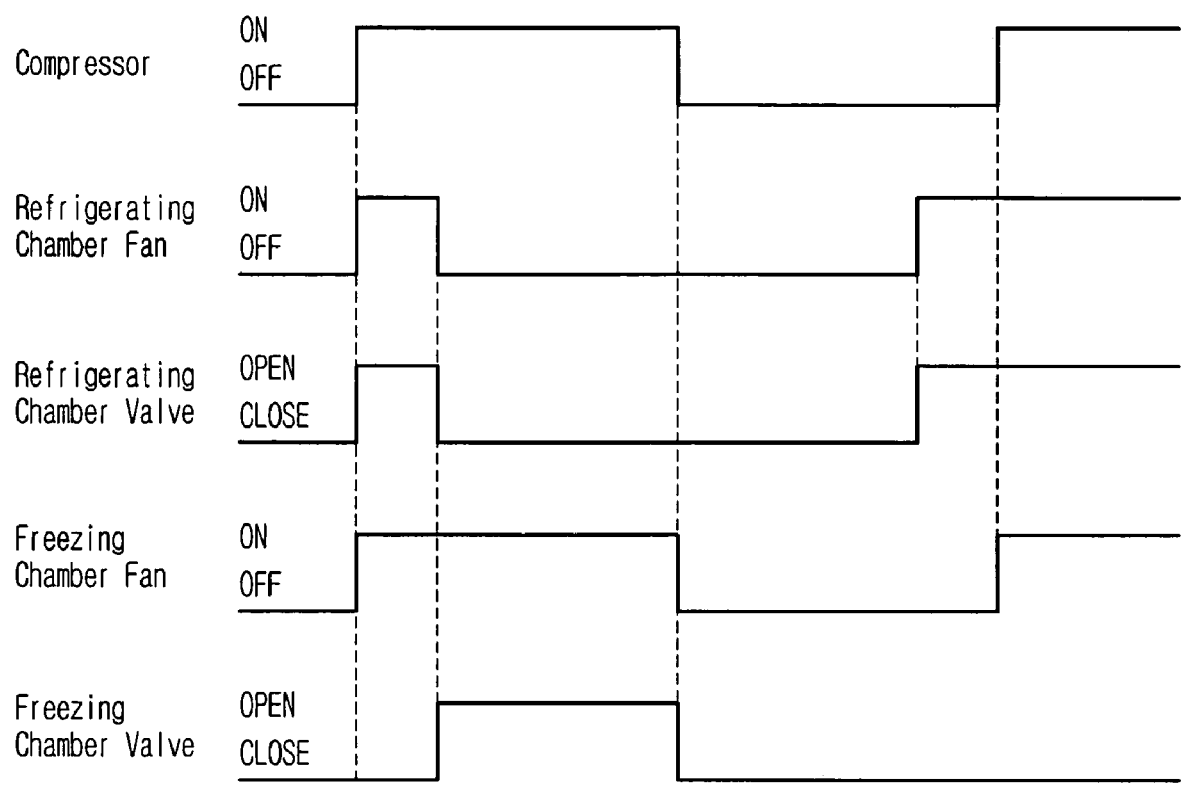
FIG. 6 is a diagram illustrating an operation control pattern of the refrigerator according to an exemplary embodiment of the present invention.

Upon operation of the compressor 22, the refrigerating chamber fan 18 and the freezing chamber fan 17 are turned on as shown in FIG. 6 (S120). The control unit 100 controls the refrigerant passage switching valve 40 until the temperature of the refrigerating chamber 12 drops less than the first preset temperature (for example, 2° C.), thereby discharging the refrigerant to only the refrigerating chamber 12 as shown in FIG. 6 (S130).

If the temperature of the refrigerating chamber 12 drops less than the first preset temperature (S140), the control unit 100 controls the refrigerant passage switching valve 40, thereby discharging the refrigerant to only the freezing chamber 11 while preventing the refrigerant from entering the refrigerating chamber 12 as shown in FIG. 6 (S150).

In this case, the refrigerating chamber fan 18 is turned off as shown in FIG. 6 (S160).

In succession, if the temperature of the freezing chamber 11 drops less than the second preset temperature (for example, −3° C.) as the freezing chamber fan 17 is continuously driven and the refrigerant is discharged to the freezing chamber 11 under operation of the refrigerant passage switching valve 40 (S170), as shown in FIG. 6, the compressor 22 is turned off (S180).

Once the operation of the compressor 22 is stopped, as shown in FIG. 6, the freezing chamber fan 17 is turned off, and the control unit 100 controls the refrigerant passage switching valve 40 to prevent the refrigerant from entering the freezing chamber 11. That is, the refrigerant passage switching valve 40 is closed to prevent the refrigerant from entering both the freezing chamber 11 and the refrigerating chamber 12 (S190).

This prevents temperature rising of the freezing chamber 11 and the refrigerating chamber 12 after the operation of the compressor 22 stops, thereby enabling a reduction of operational load and electricity consumption.

The temperature of the freezing chamber 11 or the refrigerating chamber 12 is continuously sensed by the freezing chamber temperature sensor 11a or the refrigerating chamber temperature sensor 12a, so as to check whether or not the temperature becomes higher than the first or second preset temperature.

In this case, the control unit 100 calculates a difference between the temperature of the refrigerating chamber 12 or freezing chamber 11 and a standard temperature of starting the operation of the compressor 22, i.e. the first or second preset temperature. If the calculated temperature difference is within a predetermined temperature range (for example, 0.5 to 1° C.), the control unit 100 determines whether or not only a predetermined time, approximately 5 to 10 minutes, remains before operation of the compressor 22 (S200).

If the predetermined time remains before operation of the compressor 22, the control unit 100 controls the refrigerant passage switching valve 40 to discharge the refrigerant to only the refrigerating chamber 12 as shown in FIG. 6, thereby achieving pressure balance of the refrigerant passages (S210).

Conversely, if there is a sufficient time before operation of the compressor 22, the control unit 100 determines whether or not the temperature of the refrigerating chamber evaporator 16, sensed by the refrigerating chamber evaporator temperature sensor 16a, is more than a third preset temperature (e.g., approximately 0° C.) (S220).

If the temperature of the refrigerating chamber evaporator 16 is more than the third preset temperature, the refrigerating chamber fan 18 is turned on and the operation control routine is returned just prior to Step S200 (S230).

Thereby, the refrigerating chamber fan 18 is operated when the temperature of the refrigerating chamber evaporator 16 rises more than 0° C. This allows vapor, caused by frost or dew generated on the refrigerating chamber evaporator 16, to be effectively blown into the refrigerator, thereby increasing humidification effects inside the refrigerating chamber 12 after the operation of the compressor 22 stops, and keeping freshness of food, especially, vegetables stored in the refrigerating chamber 12.

As apparent from the above description, the present invention provides a method for controlling operation of a refrigerator which can prevent rising of a temperature of the refrigerator by closing a refrigerant passage switching valve to prevent a refrigerant from entering a refrigerating chamber and freezing chamber after operation of a compressor stops, resulting in a reduction in operational load and electricity consumption.

Further, according to an exemplary embodiment of the present invention, a refrigerating chamber fan is operated when a temperature of a refrigerating chamber evaporator rises more than a predetermined temperature (e.g., 0° C.) after the operation of the compressor stops, resulting in high humidification effects of the refrigerator.

Although an exemplary embodiment of the present invention has been shown and described, it would be appreciated by those skilled in the art that the above described embodiment of the present invention is only an example for implementing a method for controlling the operation of a refrigerator and changes may be made in this embodiment without departing from the principles and spirit of the invention, the scope of which is defined in the claims and their equivalents.

What is claimed is:

1. A method for controlling operation of a refrigerator comprising a plurality of storage chambers, a plurality of evaporators installed respectively in the plurality of storage chambers, and a refrigerant passage switching valve to switch refrigerant passages connected to the respective evaporators, the method comprising:
   sensing temperatures of the plurality of storage chambers to determine whether the temperatures of the storage chambers reach preset temperatures;
   stopping operation of a compressor if the temperatures of the storage chambers reach the preset temperatures; and
   controlling the refrigerant passage switching valve after stopping operation of the compressor so that the refrigerant passages to the plurality of evaporators are closed.

2. The method according to claim 1, further comprising:
   sensing the temperatures of the storage chambers after stopping operation of the compressor to calculate a difference between the sensed temperatures and preset compressor operation staffing temperatures; and
   comparing the calculated temperature difference with a predetermined temperature range and controlling the refrigerant passage switching valve to allow the refrigerant to flow to some of the plurality of evaporators if the temperature difference is within the predetermined temperature range.

3. The method according to claim 2, wherein the some of the plurality of evaporators is a refrigerating chamber evaporator.

4. The method according to claim 1, further comprising:
   sensing temperatures of the plurality of evaporators after stopping operation of the compressor to determine whether the temperatures are more than preset standard temperatures; and
   operating cold air circulating fans if the temperatures of the evaporators are more than the standard temperatures in order to control humidity of some of the plurality of storage chambers.

5. The compressor according to claim 4, wherein the some of the plurality of storage chambers is a refrigerating chamber.

6. A method for controlling operation of a refrigerator having a plurality of storage chambers, and a plurality of evaporators and cold air circulating fans installed in the plurality of storage chambers, respectively, the method comprising:
   sensing temperatures of the plurality of storage chambers to determine whether the temperatures of the storage chambers reach preset temperatures;
   stopping operation of a compressor if the temperatures of the storage chambers reach the preset temperatures;
   sensing a temperature of some of the plurality of evaporators after stopping operation of the compressor to determine whether the temperature of the some of the plurality of evaporators is more than a preset standard temperature;
   operating the cold air circulating fans if the temperature of the some of the plurality of evaporators is more than the standard temperature in order to control humidity of the some of the plurality of storage chambers; and
   controlling the refrigerant passage switching valve after stopping operation of the compressor so that the refrigerant passages to the plurality of evaporators are closed.

7. The method according to claim 6, wherein the some of the plurality of evaporators is a refrigerating chamber evaporator.

8. The method according to claim 6, wherein the cold air circulating fans are refrigerating chamber fans.

9. A method for controlling operation of a refrigerator comprising a plurality of storage chambers, a plurality of evaporators and cold air circulating fans installed in the plurality of storage chambers, respectively, and a refrigerant passage switching valve to switch refrigerant passages connected to the plurality of evaporators, the method comprising:

sensing temperatures of the plurality of storage chambers and stopping operation of a compressor if the sensed temperatures reach preset temperatures;

controlling the refrigerant passage switching valve after stopping operation of the compressor so that the refrigerant passages connected to the plurality of evaporators are closed;

calculating a difference between the sensed temperatures and preset compressor operation staffing temperatures after closing the refrigerant passages and controlling the refrigerant passage switching valve if the temperature difference belongs within a predetermined temperature range, so as to direct the refrigerant to some of the plurality of evaporators; and operating the cold air circulating fans if the temperature of the some of the plurality of evaporators is more than a preset standard temperature after closing the refrigerant passages, so as to control humidity of some of the plurality of storage chambers.

10. The method according to claim 9, wherein the some of the plurality of evaporators is a refrigerating chamber evaporator.

11. The method according to claim 9, wherein the some of the plurality of storage chambers is a refrigerating chamber.

* * * * *